US012243985B2

United States Patent
Lee et al.

(10) Patent No.: US 12,243,985 B2
(45) Date of Patent: Mar. 4, 2025

(54) NON-AQUEOUS ELECTROLYTE SOLUTION FOR LITHIUM SECONDARY BATTERY AND LITHIUM SECONDARY BATTERY INCLUDING THE SAME

(71) Applicant: LG Energy Solution, Ltd., Seoul (KR)

(72) Inventors: Hyun Yeong Lee, Daejeon (KR); Chul Haeng Lee, Daejeon (KR); Young Min Lim, Daejeon (KR); Jung Min Lee, Daejeon (KR); Chul Eun Yeom, Daejeon (KR); Jung Gu Han, Daejeon (KR)

(73) Assignee: LG Energy Solution, Ltd., Seoul (KR)

( * ) Notice: Subject to any disclaimer, the term of this patent is extended or adjusted under 35 U.S.C. 154(b) by 621 days.

(21) Appl. No.: 17/608,278

(22) PCT Filed: Nov. 13, 2020

(86) PCT No.: PCT/KR2020/015946
§ 371 (c)(1),
(2) Date: Nov. 2, 2021

(87) PCT Pub. No.: WO2021/101174
PCT Pub. Date: May 27, 2021

(65) Prior Publication Data
US 2022/0209299 A1 Jun. 30, 2022

(30) Foreign Application Priority Data

Nov. 18, 2019 (KR) .................. 10-2019-0147431
Nov. 12, 2020 (KR) .................. 10-2020-0151165

(51) Int. Cl.
| | |
|---|---|
| *H01M 10/0568* | (2010.01) |
| *H01M 4/02* | (2006.01) |
| *H01M 4/131* | (2010.01) |
| *H01M 4/505* | (2010.01) |
| *H01M 4/525* | (2010.01) |
| *H01M 10/0525* | (2010.01) |
| *H01M 10/0567* | (2010.01) |
| *H01M 10/0569* | (2010.01) |

(52) U.S. Cl.
CPC ....... *H01M 10/0568* (2013.01); *H01M 4/131* (2013.01); *H01M 4/505* (2013.01); *H01M 4/525* (2013.01); *H01M 10/0525* (2013.01); *H01M 10/0567* (2013.01); *H01M 10/0569* (2013.01); *H01M 2004/028* (2013.01); *H01M 2300/0025* (2013.01)

(58) Field of Classification Search
CPC .. H01M 10/0568; H01M 4/131; H01M 4/505; H01M 4/525; H01M 10/0525; H01M 10/0567; H01M 10/0569; H01M 2004/028; H01M 2300/0025
See application file for complete search history.

(56) References Cited

U.S. PATENT DOCUMENTS

| | | | |
|---|---|---|---|
| 5,104,740 | A | 4/1992 | Shinkai et al. |
| 2010/0035146 | A1 | 2/2010 | Fujii et al. |
| 2012/0231330 | A1 | 9/2012 | Fujii et al. |
| 2013/0337318 | A1 | 12/2013 | Fujii et al. |
| 2014/0322596 | A1 | 10/2014 | Shatunov et al. |
| 2018/0191031 | A1 | 7/2018 | Yu et al. |
| 2018/0198163 | A1 | 7/2018 | Sekine et al. |

FOREIGN PATENT DOCUMENTS

| | | |
|---|---|---|
| CN | 102569889 A | 7/2012 |
| CN | 108370068 A | 8/2018 |
| JP | H10050344 A | 2/1998 |
| JP | H10239910 A | 9/1998 |
| JP | 2001143748 A | 5/2001 |
| JP | 2001338763 A | 12/2001 |
| JP | 2005114891 A | 4/2005 |
| JP | 3680454 B2 * | 8/2005 |
| JP | 2007012507 A | 1/2007 |
| JP | 2012043586 A | 3/2012 |
| JP | 2012248311 A | 12/2012 |
| JP | 2014216317 A | 11/2014 |
| JP | 2018523911 A | 8/2018 |
| KR | 20140127741 A | 11/2014 |
| KR | 20180025917 A | 3/2018 |
| KR | 101937898 B1 | 1/2019 |
| WO | 2008069267 A1 | 6/2008 |
| WO | 2018-120794 A1 | 7/2018 |

OTHER PUBLICATIONS

Ito, JP 3680454 Espacenet machine translation, 2005 (Year: 2005).*
International Search Report for PCT/KR2020/015946 dated Feb. 24, 2021. 2 pgs.

* cited by examiner

*Primary Examiner* — Adam A Arciero
(74) *Attorney, Agent, or Firm* — Lerner David LLP (57) ABSTRACT

A non-aqueous electrolyte solution for a lithium secondary battery and a lithium secondary battery including the same are disclosed herein. In some embodiments, a non-aqueous electrolyte solution includes a lithium salt, an organic solvent, and a compound represented by Formula 1 as an additive. A lithium secondary battery including the non-aqueous electrolyte solution has improved high-rate charge and discharge characteristics at high temperature.

7 Claims, 5 Drawing Sheets

NON-AQUEOUS ELECTROLYTE SOLUTION FOR LITHIUM SECONDARY BATTERY AND LITHIUM SECONDARY BATTERY INCLUDING THE SAME

TECHNICAL FIELD

Cross-Reference to Related Applications

This application is a national phase entry under 35 U.S.C. § 371 of International Application No. PCT/KR2020/015946, filed on Nov. 13, 2020, which claims priority from Korean Patent Application Nos. 10-2019-0147431, filed on Nov. 18, 2019, and 10-2020-0151165, filed on Nov. 12, 2020, the disclosures of which are incorporated by reference herein.

TECHNICAL FIELD

The present invention relates to a non-aqueous electrolyte solution for a lithium secondary battery and a lithium secondary battery including the same.

BACKGROUND ART

Dependence on electrical energy is gradually increasing in modern society, and, accordingly, production of the electrical energy has been further increased. In order to address environmental issues that arise during this process, renewable energy generation is in the spotlight as a next-generation power generation system. With respect to renewable energy, since it exhibits intermittent power generation characteristics, a large-capacity power storage device is indispensable to supply power stably. A lithium-ion battery is in the spotlight as a device exhibiting the highest energy density which is currently commercialized among power storage devices.

The lithium-ion battery is composed of a positive electrode formed of a transition metal oxide containing lithium, a negative electrode capable of storing the lithium, an electrolyte solution that includes an organic solvent containing a lithium salt, and a separator.

With respect to the positive electrode among these components, energy is stored through a redox reaction of transition metal, wherein this results in the fact that the transition metal must be essentially included in a positive electrode material.

A reduction in performance of the positive electrode occurs as a positive electrode active material structurally collapses during repeated charge and discharge. That is, metal ions, which have been dissolved from a surface of the positive electrode during structural collapse of the positive electrode, are electro-deposited on the negative electrode to degrade performance of the battery. This phenomenon tends to further increase when a potential of the positive electrode is increased or when the battery is exposed to high temperatures.

Thus, in order to control a degradation behavior of the battery, research has been conducted to apply an additive that forms a film on the positive electrode, and, in addition, research to suppress the electrodeposition of the dissolved transition metal on the negative electrode or the occurrence of ion substitution is being conducted.

DISCLOSURE OF THE INVENTION

Technical Problem

An aspect of the present invention provides a non-aqueous electrolyte solution for a lithium secondary battery which includes an additive forming a complex with transition metal ions dissolved from a positive electrode.

Another aspect of the present invention provides a lithium secondary battery in which high-rate charge and discharge characteristics are improved by including the non-aqueous electrolyte solution for a lithium secondary battery.

Technical Solution

According to an aspect of the present invention, there is provided a non-aqueous electrolyte solution for a lithium secondary battery which includes a lithium salt, an organic solvent, and a compound represented by Formula 1 as an additive.

[Formula 1]

wherein, in Formula 1,
$R_1$ to $R_6$ are each independently hydrogen, an alkyl group having 1 to 5 carbon atoms, or a —CN group, wherein at least one of $R_1$ to $R_6$ is a —CN group.

According to another aspect of the present invention, there is provided a lithium secondary battery including a negative electrode, a positive electrode, a separator disposed between the negative electrode and the positive electrode, and a non-aqueous electrolyte solution, wherein the non-aqueous electrolyte solution includes the non-aqueous electrolyte solution for a lithium secondary battery of the present invention.

Advantageous Effects

A compound represented by Formula 1, which is included in a non-aqueous electrolyte solution of the present invention, is a compound containing a cyano group in its structure, wherein the cyano group may suppress electrodeposition of metal ions on a negative electrode by forming a complex with the transition metal ions dissolved from a positive electrode of a lithium secondary battery. Since the non-aqueous electrolyte solution including such an additive is oxidatively decomposed before an organic solvent to form a film on a surface of the positive electrode, it may suppress a continuous decomposition reaction between the positive electrode and the organic solvent. Thus, if the non-aqueous electrolyte solution is included, a lithium secondary battery having improved high-rate charge and discharge characteristics may be achieved.

BRIEF DESCRIPTION OF THE DRAWINGS

The following drawings attached to the specification illustrate preferred examples of the present invention by example, and serve to enable technical concepts of the present invention to be further understood together with detailed description of the invention given below, and therefore the present invention should not be interpreted only with matters in such drawings.

MODE FOR CARRYING OUT THE INVENTION

Hereinafter, the present invention will be described in more detail.

It will be understood that words or terms used in the specification and claims shall not be interpreted as the meaning defined in commonly used dictionaries, and it will be further understood that the words or terms should be interpreted as having a meaning that is consistent with their meaning in the context of the relevant art and the technical idea of the invention, based on the principle that an inventor may properly define the meaning of the words or terms to best explain the invention.

Conventionally, transition metals constituting a positive electrode are easily dissolved into an electrolyte solution due to an acid generated by a side reaction between the positive electrode and the electrolyte solution or an acid formed by hydrolysis/thermal decomposition of a lithium salt, for example, hydrofluoric acid (HF), or structural variation of the positive electrode according to repeated charge and discharge, and dissolved transition metal ions are re-deposited on the positive electrode to be a cause of increasing resistance of the positive electrode. Also, since the transition metals moved to a negative electrode through the electrolyte solution are electrodeposited on the negative electrode to self-discharge the negative electrode and destruct a solid electrolyte interphase (SEI) that gives passivation ability to the negative electrode, interfacial resistance of the negative electrode is increased by promoting an additional electrolyte solution decomposition reaction.

Since this series of reactions reduces an amount of available lithium ions in a battery, it not only leads to the degradation of capacity of the battery, but an electrolyte solution decomposition reaction is also accompanied, and thus, resistance is also increased. In addition, in a case in which metallic impurities are included in the electrode when the positive electrode is configured, since metallic foreign matter is dissolved from the positive electrode during initial charge, the dissolved metal ions are electrodeposited on a surface of the negative electrode. Since the electrodeposited metal ions grow into dendrites to cause an internal short circuit of the battery, it becomes a major cause of low voltage failure.

The present invention aims to provide a non-aqueous electrolyte solution for a lithium secondary battery, which may form a robust film on a surface of the positive electrode through oxidative decomposition before an organic solvent by including an additive capable of preventing the electrodeposition of the metal ions on the negative electrode by forming a complex with the dissolved metal ions, a cause of such degradation and failure behavior, and a lithium secondary battery in which high-rate charge and discharge at high temperature are improved by including the same.

Non-Aqueous Electrolyte Solution for Lithium Secondary Battery

Specifically, in an embodiment of the present invention, provided is a non-aqueous electrolyte solution for a lithium secondary battery which includes:

a lithium salt, an organic solvent, and a compound represented by Formula 1 as an additive,

[Formula 1]

In Formula 1, $R_1$ to $R_6$ are each independently hydrogen, an alkyl group having 1 to 5 carbon atoms, or a —CN group, wherein at least one of $R_1$ to $R_6$ is a —CN group.

Lithium Salt

First, in the non-aqueous electrolyte solution for a lithium secondary battery of the present invention, any lithium salt typically used in an electrolyte solution for a lithium secondary battery may be used as the lithium salt without limitation, and, for example, the lithium salt may include $Li^+$ as a cation, and may include at least one selected from the group consisting of $F^-$, $Cl^-$, $Br^-$, $I^-$, $NO_3^-$, $N(CN)_2^-$, $BF_4^-$, $ClO_4^-$, $B_{10}Cl_{10}^-$, $AlCl_4^-$, $AlO_4^-$, $PF_6^-$, $CF_3SO_3^-$, $CH_3CO_2^-$, $CF_3CO_2^-$, $AsF_6^-$, $SbF_6^-$, $CH_3SO_3^-$, $(CF_3CF_2SO_2)_2N^-$, $(CF_3SO_2)_2N^-$, $(FSO_2)_2N^-$, $BF_2C_2O_4^-$, $BC_4O_8^-$, $PF_4C_2O_4^-$, $PF_2C_4O_8^-$, $(CF_3)_2PF_4^-$, $(CF_3)_3PF_3^-$, $(CF_3)_4PF_2^-$, $(CF_3)_5PF^-$, $(CF_3)_6P^-$, $C_4F_9SO_3^-$, $CF_3CF_2SO_3^-$, $CF_3CF_2(CF_3)_2CO^-$, $(CF_3SO_2)_2CH^-$, $CF_3(CF_2)_7SO_3^-$, and $SCN^-$ as an anion.

Specifically, the lithium salt may include a single material selected from the group consisting of LiCl, LiBr, LiI, $LiBF_4$, $LiClO_4$, $LiB_{10}Cl_{10}$, $LiAlCl_4$, $LiAlO_4$, $LiPF_6$, $LiCF_3SO_3$, $LiCH_3CO_2$, $LiCF_3CO_2$, $LiAsF_6$, $LiSbF_6$, $LiCH_3SO_3$, LiFSI (lithium bis(fluorosulfonyl)imide, $LiN(SO_2F)_2$), LiBETI (lithium bis(perfluoroethanesulfonyl)imide, $LiN(SO_2CF_2CF_3)_2$), and LiTFSI (lithium bis(trifluoromethanesulfonyl)imide, $LiN(SO_2CF_3)_2$), or a mixture of two or more thereof. In addition to them, any lithium salt commonly used in an electrolyte solution of a lithium secondary battery may be used without limitation.

The lithium salt may be appropriately changed in a normally usable range, but may be included in a concentration of 0.8 M to 4.0 M, for example, 1.0 M to 3.0 M in the electrolyte solution to obtain an optimum effect of forming a film for preventing corrosion of a surface of an electrode. If the concentration of the lithium salt is less than 0.8 M, an effect of improving low-temperature output of the lithium secondary battery and improving cycle characteristics during high-temperature storage is insignificant, and, if the concentration of the lithium salt is greater than 4.0 M, impregnability of the electrolyte solution may be reduced due to an increase in viscosity of the non-aqueous electrolyte solution.

(2) Organic Solvent

In the non-aqueous electrolyte solution for a lithium secondary battery according to the present specification, the organic solvent may include a cyclic carbonate-based organic solvent, a linear carbonate-based organic solvent, or a mixed organic solvent thereof.

The cyclic carbonate-based organic solvent is an organic solvent which may well dissociate a lithium salt in an electrolyte due to high permittivity as a highly viscous organic solvent, wherein specific examples of the cyclic carbonate-based organic solvent may be at least one organic solvent selected from the group consisting of ethylene carbonate (EC), propylene carbonate (PC), 1,2-butylene carbonate, 2,3-butylene carbonate, 1,2-pentylene carbonate, 2,3-pentylene carbonate, and vinylene carbonate, and, among them, the cyclic carbonate-based organic solvent may include ethylene carbonate.

Also, the linear carbonate-based organic solvent is an organic solvent having low viscosity and low permittivity, wherein typical examples of the linear carbonate-based organic solvent may be at least one organic solvent selected from the group consisting of dimethyl carbonate (DMC), diethyl carbonate (DEC), dipropyl carbonate, ethyl methyl carbonate (EMC), methylpropyl carbonate, and ethylpropyl carbonate, and the linear carbonate-based organic solvent may specifically include ethyl methyl carbonate (EMC).

In order to prepare an electrolyte solution having high ionic conductivity, a mixed organic solvent of the cyclic carbonate-based organic solvent and the linear carbonate-based organic solvent may be used as the organic solvent.

Furthermore, the organic solvent may further include a linear ester-based organic solvent and/or a cyclic ester-based organic solvent in addition to the cyclic carbonate-based organic solvent and/or the linear carbonate-based organic solvent.

Specific examples of the linear ester-based organic solvent may be at least one organic solvent selected from the group consisting of methyl acetate, ethyl acetate, propyl acetate, methyl propionate, ethyl propionate, propyl propionate, and butyl propionate.

Also, the cyclic ester-based organic solvent may include at least one organic solvent selected from the group consisting of γ-butyrolactone, γ-valerolactone, γ-caprolactone, σ-valerolactone, and ε-caprolactone.

The organic solvent may be used by adding an organic solvent typically used in an electrolyte solution for a lithium secondary battery without limitation, if necessary. For example, the organic solvent may further include at least one organic solvent selected from an ether-based organic solvent, an amide-based organic solvent, and a nitrile-based organic solvent.

(3) Additive

The non-aqueous electrolyte solution for a lithium secondary battery of the present invention may include a compound represented by the following Formula 1 as an additive.

[Formula 1]

In Formula 1, $R_1$ to $R_6$ are each independently hydrogen, an alkyl group having 1 to 5 carbon atoms, or a —CN group, wherein at least one of $R_1$ to $R_6$ is a —CN group.

Specifically, in Formula 1, $R_1$ to $R_6$ may be each independently hydrogen, an alkyl group having 1 to 4 carbon atoms, or a —CN group, wherein at least one of $R_1$ to $R_6$ may be a —CN group.

Also, in Formula 1, $R_1$ may be an alkyl group having 1 to 3 carbon atoms or a —CN group, $R_2$ may be hydrogen or an alkyl group having 1 to 3 carbon atoms, and $R_3$ to $R_6$ may be each independently hydrogen, an alkyl group having 1 to 4 carbon atoms, or a —CN group, wherein at least one of $R_1$ and $R_3$ to $R_6$ may be a —CN group.

Furthermore, in Formula 1, $R_1$ may be a —CN group, $R_2$ may be hydrogen or an alkyl group having 1 to 3 carbon atoms, and $R_3$ to $R_6$ may be each independently hydrogen, an alkyl group having 1 to 3 carbon atoms, or a —CN group.

Also, in Formula 1, $R_1$ may be a —CN group, $R_2$ may be hydrogen, $R_3$ and $R_6$ may be each independently hydrogen or a —CN group, and $R_4$ and $R_5$ may be each independently hydrogen, an alkyl group having 1 to 3 carbon atoms, or a —CN group.

Furthermore, in Formula 1, $R_1$ may be a —CN group, $R_2$ may be hydrogen, $R_3$ and $R_6$ may be each independently hydrogen, and $R_4$ and $R_5$ may be each independently hydrogen or a —CN group.

Preferably, the compound represented by Formula 1 may be a compound represented by the following Formula 1a, for example, coumarin-3-carbonitrile.

[Formula 1a]

In the present invention, the compound represented by Formula 1, which is included as an electrolyte solution additive, is a compound containing a cyano group in its structure, wherein the cyano group may suppress the electrodeposition of the metal ions on the negative electrode by forming a complex with the metal ions dissolved from the positive electrode of the lithium secondary battery. Furthermore, the additive may form a robust film on the surface of the positive electrode through oxidative decomposition before the organic solvent, and the film may suppress a continuous decomposition reaction between the positive electrode and the organic solvent. Thus, a lithium secondary battery having improved high-rate charge and discharge may be achieved by including the non-aqueous electrolyte solution including the additive.

The compound of Formula 1 may be included in an amount of 0.05 wt % or more to less than 1.2 wt %, for example, 0.1 wt % to 1 wt % based on a total weight of the non-aqueous electrolyte solution.

In a case in which the compound represented by Formula 1 is included in an amount within the above range, a secondary battery having more improved overall performance may be prepared. For example, in the case that the compound represented by Formula 1 is included in an amount of 0.05 wt % or more to less than 1.2 wt %, it may remove the metal ions and the complex and may simultaneously form a robust film on the surface of the positive electrode while suppressing disadvantages, such as a side reaction caused by the additive, a reduction in initial capacity, and a increase in resistance, as much as possible. If the amount of the compound represented by Formula 1 included is 1.2 wt % or more, since solubility of the additive in the non-aqueous organic solvent is reduced, the side reaction caused by the additive may occur, or the reduction in the initial capacity due to the increase in the resistance may occur.

Lithium Secondary Battery

Also, in another embodiment of the present invention, there is provided a lithium secondary battery including the non-aqueous electrolyte solution for a lithium secondary battery of the present invention.

The lithium secondary battery of the present invention may be prepared by forming an electrode assembly, in which a positive electrode, a negative electrode, and a separator disposed between the positive electrode and the negative electrode are sequentially stacked, accommodating the electrode assembly in a battery case, and then injecting the non-aqueous electrolyte solution of the present invention.

A typical method known in the art may be used as a method of preparing the lithium secondary battery of the present invention, and, specifically, the method of preparing the lithium secondary battery of the present invention is as described below.

(1) Positive Electrode

The positive electrode may be prepared by coating a positive electrode collector with a positive electrode slurry including a positive electrode active material, a binder, a conductive agent, and a solvent, and then drying and rolling the coated positive electrode collector.

The positive electrode collector is not particularly limited so long as it has conductivity without causing adverse chemical changes in the battery, and, for example, stainless steel, aluminum, nickel, titanium, fired carbon, or aluminum or stainless steel that is surface-treated with one of carbon, nickel, titanium, silver, or the like may be used.

The positive electrode active material is a compound capable of reversibly intercalating and deintercalating lithium, wherein the positive electrode active material may specifically include a lithium composite metal oxide including lithium and at least one metal selected from the group consisting of nickel (Ni), cobalt (Co), manganese (Mn), iron (Fe), and aluminum (Al).

More specifically, the lithium composite metal oxide may include lithium-manganese-based oxide (e.g., $LiMnO_2$, $LiMn_2O_4$, etc.), lithium-cobalt-based oxide (e.g., $LiCoO_2$, etc.), lithium-nickel-based oxide (e.g., $LiNiO_2$, etc.), lithium-nickel-manganese-based oxide (e.g., $LiNi_{1-Y}Mn_YO_2$ (where $0<Y<1$), $LiMn_{2-Z}Ni_ZO_4$ (where $0<Z<2$)), lithium-nickel-cobalt-based oxide (e.g., $LiNi_{1-Y1}Co_{Y1}O_2$ (where $0<Y1<1$)), lithium-manganese-cobalt-based oxide (e.g., $LiCo_{1-Y2}Mn_{Y2}O_2$ (where $0<Y2<1$), $LiMn_{2-Z1}Co_{Z1}O_4$ (where $0<Z1<2$)), lithium-nickel-manganese-cobalt-based oxide (e.g., $Li(Ni_pCo_qMn_{r1})O_2$ (where $0<p<1$, $0<q<1$, $0<r1<1$, and $p+q+r1=1$) or $Li(Ni_{p1}Co_{q1}Mn_{r2})O_4$ (where $0<p1<2$, $0<q1<2$, $0<r2<2$, and $p1+q1+r2=2$), or lithium-nickel-cobalt-transition metal (M) oxide (e.g., $Li(Ni_{p2}Co_{q2}Mn_{r3}M_{S2})O_2$ (where M is selected from the group consisting of aluminum (Al), iron (Fe), vanadium (V), chromium (Cr), titanium (Ti), tantalum (Ta), magnesium (Mg), and molybdenum (Mo), and p2, q2, r3, and S2 are atomic fractions of each independent elements, wherein $0<p2<1$, $0<q2<1$, $0<r3<1$, $0<S2<1$, and $p2+q2+r3+S2=1$), and any one thereof or a compound of two or more thereof may be included. Among these materials, in terms of the improvement of capacity characteristics and stability of the battery, the lithium composite metal oxide may include $LiCoO_2$, $LiMnO_2$, $LiNiO_2$, lithium nickel manganese cobalt oxide (e.g., $Li(Ni_{0.6}Mn_{0.2}Co_{0.2})O_2$, $Li(Ni_{0.5}Mn_{0.3}Co_{0.2})O_2$, or $Li(Ni_{0.8}Mn_{0.1}Co_{0.1})O_2$), or lithium nickel cobalt aluminum oxide (e.g., $LiNi_{0.8}Co_{0.15}Al_{0.05}O_2$, etc.), and, in consideration of a significant improvement due to the control of type and content ratio of elements constituting the lithium composite metal oxide, the lithium composite metal oxide may include $Li(Ni_{0.6}Mn_{0.2}Co_{0.2})O_2$, $Li(Ni_{0.5}Mn_{0.3}Co_{0.2})O_2$, $Li(Ni_{0.7}Mn_{0.15}Co_{0.15})O_2$, or $Li(Ni_{0.8}Mn_{0.1}Co_{0.1})O_2$, and any one thereof or a mixture of two or more thereof may be used.

The positive electrode active material may be included in an amount of 80 wt % to 99 wt %, for example, 90 wt % to 99 wt % based on a total weight of solid content in the positive electrode slurry. In a case in which the amount of the positive electrode active material is 80 wt % or less, since energy density is reduced, capacity may be reduced.

The binder is a component that assists in the binding between the active material and the conductive agent and in the binding with the current collector, wherein the binder is commonly added in an amount of 1 wt % to 30 wt % based on the total weight of the solid content in the positive electrode slurry. Examples of the binder may be polyvinylidene fluoride, polyvinyl alcohol, carboxymethylcellulose (CMC), starch, hydroxypropylcellulose, regenerated cellulose, polyvinylpyrrolidone, polytetrafluoroethylene, polyethylene, polypropylene, a styrene-butadiene rubber, a fluoro rubber, various copolymers, and the like.

Also, the conductive agent is a material providing conductivity without causing adverse chemical changes in the battery, wherein it may be added in an amount of 1 wt % to 20 wt % based on the total weight of the solid content in the positive electrode slurry.

As a typical example of the conductive agent, a conductive material, such as: carbon powder such as carbon black, acetylene black, Ketjen black, channel black, furnace black, lamp black, or thermal black; graphite powder such as natural graphite with a well-developed crystal structure, artificial graphite, or graphite; conductive fibers such as carbon fibers or metal fibers; conductive powder such as fluorocarbon powder, aluminum powder, and nickel powder; conductive whiskers such as zinc oxide whiskers and potassium titanate whiskers; conductive metal oxide such as titanium oxide; or polyphenylene derivatives, may be used.

Furthermore, the solvent may include an organic solvent, such as N-methyl-2-pyrrolidone (NMP), and may be used in an amount such that desirable viscosity is obtained when the positive electrode active material as well as optionally the binder and the conductive agent are included. For example, the solvent may be included in an amount such that a concentration of the solid content in the slurry including the positive electrode active material as well as optionally the binder and the conductive agent is in a range of 10 wt % to 60 wt %, for example, 20 wt % to 50 wt %.

(2) Negative Electrode

The negative electrode may be prepared by coating a negative electrode collector with a negative electrode slurry including a negative electrode active material, a binder, a conductive agent, and a solvent, and then drying and rolling the coated negative electrode collector.

The negative electrode collector generally has a thickness of 3 μm to 500 μm. The negative electrode collector is not particularly limited so long as it has high conductivity without causing adverse chemical changes in the battery, and, for example, copper, stainless steel, aluminum, nickel, titanium, fired carbon, copper or stainless steel that is surface-treated with one of carbon, nickel, titanium, silver, or the like, an aluminum-cadmium alloy, or the like may be used. Also, similar to the positive electrode collector, the negative electrode collector may have fine surface roughness to improve bonding strength with the negative electrode active material, and the negative electrode collector may be used in various shapes such as a film, a sheet, a foil, a net, a porous body, a foam body, a non-woven fabric body, and the like.

Furthermore, the negative electrode active material may include at least one selected from the group consisting of lithium metal, a carbon material capable of reversibly intercalating/deintercalating lithium ions, metal or an alloy of lithium and the metal, a metal composite oxide, a material which may be doped and undoped with lithium, and a transition metal oxide.

As the carbon material capable of reversibly intercalating/deintercalating lithium ions, a carbon-based negative electrode active material generally used in a lithium ion secondary battery may be used without particular limitation, and, as a typical example, crystalline carbon, amorphous carbon, or both thereof may be used. Examples of the crystalline carbon may be graphite such as irregular, planar, flaky, spherical, or fibrous natural graphite or artificial graphite, and examples of the amorphous carbon may be soft carbon (low-temperature sintered carbon) or hard carbon, mesophase pitch carbide, and fired cokes.

As the metal or the alloy of lithium and the metal, a metal selected from the group consisting of copper (Cu), nickel (Ni), sodium (Na), potassium (K), rubidium (Rb), cesium (Cs), francium (Fr), beryllium (Be), magnesium (Mg), calcium (Ca), strontium (Sr), silicon (Si), antimony (Sb), lead (Pb), indium (In), zinc (Zn), barium (Ba), radium (Ra), germanium (Ge), aluminum (Al), and tin (Sn), or an alloy of lithium and the metal may be used.

One selected from the group consisting of PbO, $PbO_2$, $Pb_2O_3$, $Pb_3O_4$, $Sb_2O_3$, $Sb_2O_4$, $Sb_2O_5$, GeO, $GeO_2$, $Bi_2O_3$, $Bi_2O_4$, $Bi_2O_5$, $Li_xFe_2O_3$ ($0 \leq x \leq 1$), $Li_xWO_2$ ($0 \leq x \leq 1$), and $Sn_xMe_{1-x}Me'_yO_z$ (Me: manganese (Mn), Fe, Pb, or Ge; Me': Al, boron (B), phosphorus (P), Si, Groups I, II and III elements of the periodic table, or halogen; $0 < x \leq 1$; $1 \leq y \leq 3$; $1 \leq z \leq 8$) may be used as the metal composite oxide.

The material, which may be doped and undoped with lithium, may include Si, $SiO_x$ ($0 < x \leq 2$), a Si—Y alloy (where Y is an element selected from the group consisting of alkali metal, alkaline earth metal, a Group 13 element, a Group 14 element, transition metal, a rare earth element, and a combination thereof, and is not Si), Sn, $SnO_2$, and Sn—Y (where Y is an element selected from the group consisting of alkali metal, alkaline earth metal, a Group 13 element, a Group 14 element, transition metal, a rare earth element, and a combination thereof, and is not Sn), and a mixture of $SiO_2$ and at least one thereof may also be used. The element Y may be selected from the group consisting of Mg, Ca, Sr, Ba, Ra, scandium (Sc), yttrium (Y), Ti, zirconium (Zr), hafnium (Hf), rutherfordium (Rf), V, niobium (Nb), Ta, dubnium (Db), Cr, Mo, tungsten (W), seaborgium (Sg), technetium (Tc), rhenium (Re), bohrium (Bh), Fe, Pb, ruthenium (Ru), osmium (Os), hassium (Hs), rhodium (Rh), iridium (Ir), palladium (Pd), platinum (Pt), Cu, silver (Ag), gold (Au), Zn, cadmium (Cd), B, Al, gallium (Ga), Sn, In, Ge, P, arsenic (As), Sb, bismuth (Bi), sulfur (S), selenium (Se), tellurium (Te), polonium (Po), and a combination thereof.

The transition metal oxide may include lithium-containing titanium composite oxide (LTO), vanadium oxide, and lithium vanadium oxide.

The negative electrode active material may be included in an amount of 80 wt % to 99 wt % based on a total weight of solid content in the negative electrode slurry.

The binder is a component that assists in the binding between the conductive agent, the active material, and the current collector, wherein the binder is commonly added in an amount of 1 wt % to 30 wt % based on the total weight of the solid content in the negative electrode slurry. Examples of the binder may be polyvinylidene fluoride, polyvinyl alcohol, carboxymethylcellulose (CMC), starch, hydroxypropylcellulose, regenerated cellulose, polyvinylpyrrolidone, polytetrafluoroethylene, polyethylene, polypropylene, a styrene-butadiene rubber, a fluoro rubber, and various copolymers thereof.

The conductive agent is a component for further improving the conductivity of the negative electrode active material, wherein the conductive agent may be added in an amount of 1 wt % to 20 wt % based on the total weight of the solid content in the negative electrode slurry. Any conductive agent may be used without particular limitation so long as it has conductivity without causing adverse chemical changes in the battery, and, for example, a conductive material, such as: carbon powder such as carbon black, acetylene black, Ketjen black, channel black, furnace black, lamp black, or thermal black; graphite powder such as natural graphite with a well-developed crystal structure, artificial graphite, or graphite; conductive fibers such as carbon fibers or metal fibers; conductive powder such as fluorocarbon powder, aluminum powder, and nickel powder; conductive whiskers such as zinc oxide whiskers and potassium titanate whiskers; conductive metal oxide such as titanium oxide; or polyphenylene derivatives, may be used.

The solvent may include water or an organic solvent, such as NMP and alcohol, and may be used in an amount such that desirable viscosity is obtained when the negative electrode active material as well as optionally the binder and the conductive agent are included. For example, the solvent may be included in an amount such that a concentration of the solid content in the negative electrode slurry including the negative electrode active material as well as optionally the binder and the conductive agent is in a range of 50 wt % to 75 wt %, for example, 50 wt % to 65 wt %.

(3) Separator

A typical porous polymer film generally used, for example, a porous polymer film prepared from a polyolefin-based polymer, such as an ethylene homopolymer, a propylene homopolymer, an ethylene/butene copolymer, an ethylene/hexene copolymer, and an ethylene/methacrylate copolymer, may be used alone or in a lamination therewith as the separator included in the lithium secondary battery of the present invention, and a typical porous nonwoven fabric, for example, a nonwoven fabric formed of high melting point glass fibers or polyethylene terephthalate fibers may be used, but the present invention is not limited thereto.

A shape of the lithium secondary battery of the present invention is not particularly limited, but a cylindrical type using a can, a prismatic type, a pouch type, or a coin type may be used.

Hereinafter, the present invention will be described in more detail according to examples. However, the invention may be embodied in many different forms and should not be construed as being limited to the embodiments set forth herein. Rather, these example embodiments are provided so that this description will be thorough and complete, and will fully convey the scope of the present invention to those skilled in the art.

EXAMPLES

I. Preparation of Non-Aqueous Electrolyte Solution for Lithium Secondary Battery

Comparative Example 1

After ethylene carbonate (EC) and ethyl methyl carbonate (EMC) were mixed in a volume ratio of 1:2, $LiPF_6$ was dissolved such that a concentration of the $LiPF_6$ was 1.0 M to prepare an electrolyte solution (A-1).

Comparative Example 2

After ethylene carbonate (EC), propylene carbonate (PC), ethyl propionate (EP), and propyl propionate (PP) were mixed in a volume ratio of 2:1:2.5:4.5, $LiPF_6$ and LiFSI were dissolved such that concentrations of the $LiPF_6$ and the LiFSI were respectively 0.8 M and 0.2 M to prepare an electrolyte solution (A-2).

Example 1

A non-aqueous electrolyte solution (B-1) for a lithium secondary battery of the present invention was prepared by additionally adding 0.1 g of coumarin-3-carbonitrile to 99.9 g of the electrolyte solution (A-1) of Comparative Example 1.

Example 2

A non-aqueous electrolyte solution (B-2) for a lithium secondary battery of the present invention was prepared by additionally adding 1.0 g of coumarin-3-carbonitrile to 99.0 g of the electrolyte solution (A-1) of Comparative Example 1.

Example 3

A non-aqueous electrolyte solution (B-3) for a lithium secondary battery of the present invention was prepared by additionally adding 0.2 g of a coumarin-3-carbonitrile compound to 99.8 g of the electrolyte solution (A-2) of Comparative Example 2.

Example 4

A non-aqueous electrolyte solution (B-4) for a lithium secondary battery of the present invention was prepared by additionally adding 1.2 g of a coumarin-3-carbonitrile compound to 98.8 g of the electrolyte solution (A-2) of Comparative Example 2.

II. Secondary Battery Preparation

Example 5

A positive electrode active material ($Li(Ni_{0.8}Co_{0.1}Mn_{0.1})O_2$), carbon black as a conductive agent, and polyvinylidene fluoride, as a binder, were added to N-methyl-2-pyrrolidone (NMP), as a solvent, at a weight ratio of 98:1:1 to prepare a positive electrode slurry (solid content 40 wt %). A 20 μm thick positive electrode collector (Al thin film) was coated with the positive electrode slurry, dried, and roll-pressed to prepare a positive electrode.

A negative electrode active material (artificial graphite: natural graphite:SiO=85:10:5 weight ratio), carbon black as a conductive agent, an SBR as a binder, and CMC, as a thickener, were added to NMP at a weight ratio of 95.6:1:2.3:1.1 to prepare a negative electrode slurry (solid content: 90 wt %). A 10 μm thick copper (Cu) thin film, as a negative electrode collector, was coated with the negative electrode slurry, dried, and roll-pressed to prepare a negative electrode.

After an electrode assembly was prepared by sequentially stacking the above-prepared positive electrode, a separator formed of a porous polyethylene film, and the negative electrode, the electrode assembly was put in a pouch type battery case, and the non-aqueous electrolyte solution (B-3) for a lithium secondary battery prepared in Example 3 was injected thereinto to prepare a pouch type lithium secondary battery.

Example 6

A pouch type lithium secondary battery was prepared in the same manner as in Example 5 except that the non-aqueous electrolyte solution (B-4) for a lithium secondary battery of Example 4, instead of the non-aqueous electrolyte solution (B-3) for a lithium secondary battery of Example 3, was used.

Comparative Example 3

A pouch type lithium secondary battery was prepared in the same manner as in Example 5 except that the electrolyte solution (A-2) of Comparative Example 2, instead of the non-aqueous electrolyte solution (B-3) for a lithium secondary battery of Example 3, was used.

EXPERIMENTAL EXAMPLES

Experimental Example 1. Metal (Co) Ion Electrodeposition Evaluation

Non-aqueous electrolyte solutions for a lithium secondary battery of Examples 1-1 and 2-1 were prepared for metal ion electrodeposition evaluation by adding 0.1 g of cobalt (II) tetrafluoroborate hexahydrate ($Co(BF_4)_2 \cdot 6H_2O$), metallic foreign matter, as an optional component, to 99.9 g of the non-aqueous electrolyte solutions (B-1 and B-2) for a lithium secondary battery which were prepared in Examples 1 and 2, respectively (see Table 1 below).

Also, a non-aqueous electrolyte solution for a lithium secondary battery of Comparative Example 1-1 was prepared for metal ion electrodeposition evaluation by adding 0.1 g of cobalt (II) tetrafluoroborate hexahydrate ($Co(BF_4)_2 \cdot 6H_2O$), metallic foreign matter, as an optional component, to 99.9 g of the electrolyte solution (A-1) prepared in Comparative Example 1 (see Table 1 below).

TABLE 1

| | Non-aqueous electrolyte solution | amount (g) | Metallic foreign matter Type | Addition amount (g) |
|---|---|---|---|---|
| Example 1-1 | B-1 | 99.9 | Cobalt (II) tetrafluoroborate hexahydrate ($Co(BF_4)_2 \cdot 6H_2O$) | 0.1 |
| Example 2-1 | B-2 | 99.9 | | 0.1 |
| Comparative Example 1-1 | A-1 | 99.9 | | 0.1 |

Then, electrochemical stabilities of the electrolyte solution (A-1) prepared in Comparative Example 1 not containing metallic foreign matter and the non-aqueous electrolyte solutions for a lithium secondary battery of Examples 1-1 and 2-1 and Comparative Example 1-1 containing metallic foreign matter for metal ion electrodeposition evaluation were measured using linear sweep voltammetry (LSV) to evaluate an effect of removing transition metal (Co) ions.

In this case, a working electrode was a platinum (Pt) disk (Φ 1.6 mm) electrode, a reference electrode was lithium metal, a Pt wire electrode was used as an auxiliary electrode, and the measurement was made at a scan rate of 10 mV/s in an open circuit voltage (OCV) range of about 0.2 V. The measurement was performed in a glove box in an argon (Ar) atmosphere having moisture and oxygen concentrations at 23° C. of 10 ppm or less, and the results thereof are presented in FIG. 1.

Figure 1:
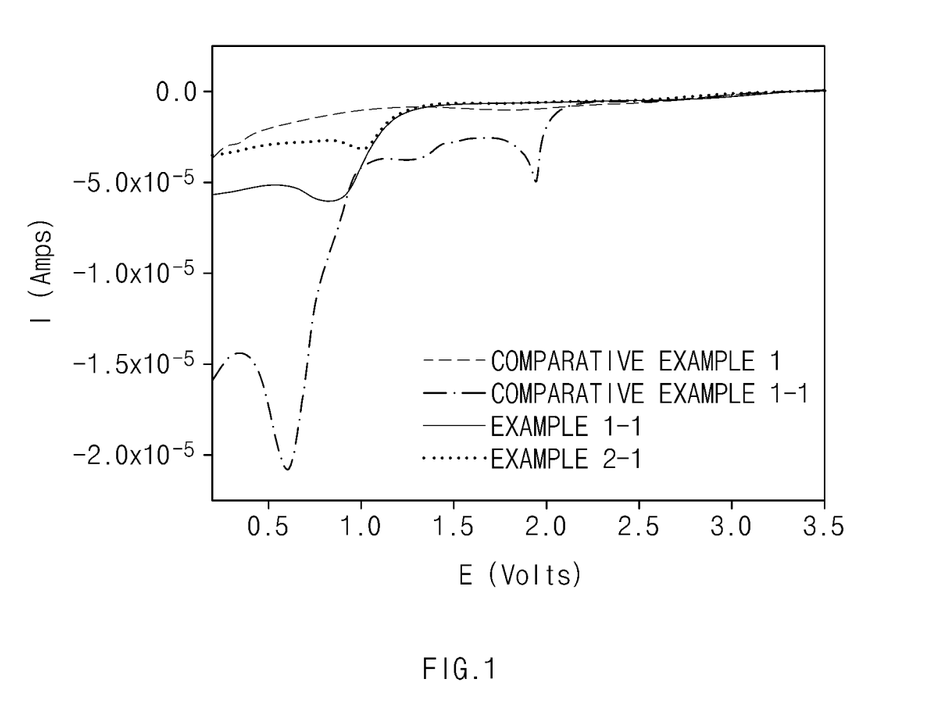
FIG. 1 is a graph illustrating the results of electrochemical stability evaluation of non-aqueous electrolyte solutions according to Experimental Example 1.

Referring to FIG. 1, with respect to the non-aqueous electrolyte solution for a lithium secondary battery of Comparative Example 1 not containing metallic foreign matter which was used as a reference example, it may be understood that a change in current was not large between 0.5 V and 2.5 V.

With respect to the non-aqueous electrolyte solution for a lithium secondary battery of Comparative Example 1-1 only containing metallic foreign matter without an additive, since a concentration of free metal (Co) ions in the electrolyte solution was not only increased, but a side reaction also occurred as the excessive amount of the metal ions were electrodeposited on a surface of the Pt disk electrode, a rapid increased in the current was confirmed between 0.5 V and 2.5 V.

In contrast, with respect to the non-aqueous electrolyte solutions for a lithium secondary battery of Examples 1-1 and 2-1 of the present invention which included the additive together with metallic foreign matter, the rapid increased in the current was suppressed even if the metallic foreign matter was included, and, particularly, with respect to the non-aqueous electrolyte solution for a lithium secondary battery of Example 2-1 in which the amount of the additive was large, since the side reaction due to the metallic foreign matter was more effectively suppressed, it may be understood that a current lower than that of the non-aqueous electrolyte solution for a lithium secondary battery of Example 1-1 flowed.

The reason for this was due to the fact that, since the amount of the additive in the non-aqueous electrolyte solution for a lithium secondary battery of Example 2 was greater than that of the non-aqueous electrolyte solution for a lithium secondary battery of Example 1, the complex with the metal ions was better formed to reduce the concentration of the free Co ions in the electrolyte solution.

Experimental Example 2. Decomposition Start Voltage Measurement

Decomposition start voltages were measured for the non-aqueous electrolyte solution (B-3) for a lithium secondary battery prepared in Example 3 and the electrolyte solution (A-2) prepared in Comparative Example 2 using linear sweep voltammetry (LSV).

In this case, a working electrode was a platinum (Pt) disk (Φ 1.6 mm) electrode, a reference electrode was lithium metal, a Pt wire electrode was used as an auxiliary electrode, and the measurement was made at a scan rate of 20 mV/s in an open circuit voltage (OCV) range of about 6 V. The measurement was performed in a glove box in an argon (Ar) atmosphere having moisture and oxygen concentrations at 23° C. of 10 ppm or less, and the results thereof are presented in FIG. 2.

Figure 2:
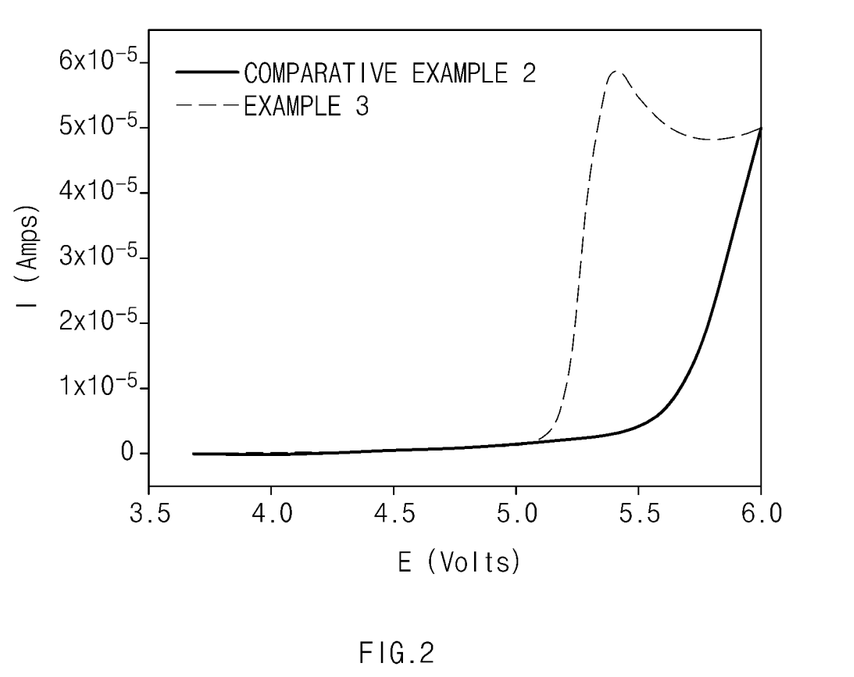
FIG. 2 is a graph illustrating the results of decomposition start voltage measurement of non-aqueous electrolyte solutions of Example 3 and Comparative Example 2 according to Experimental Example 2.

Referring to FIG. 2, with respect to the non-aqueous electrolyte solution (B-3) for a lithium secondary battery of Example 3, it may be understood that an oxidation current started at a lower potential than that of the electrolyte solution (A-2) of Comparative Example 2.

From these results, since the additive included in the non-aqueous electrolyte for a lithium secondary battery of the present invention was oxidatively decomposed before the organic solvent during overcharge of the lithium secondary battery to form a film on the surface of the positive electrode and the film may suppress the decomposition of the organic solvent to suppress gas generation due to the decomposition of the organic solvent, it may be predicted that stability of the lithium secondary battery during overcharge may be secured.

Experimental Example 3. Evaluation of SEI Formation (1)

After initial charge (formation) was performed on each of the secondary batteries prepared in Example 5 and Comparative Example 3 at a constant current of 0.1 C rate for 3 hours using PNE-0506 charge/discharge equipment (manufacturer: PNE SOLUTION Co., Ltd., 5 V, 6 A), a differential capacity curve, which was obtained by performing the first derivative of a capacity-voltage curve thus obtained, was illustrated in FIG. 3.

Figure 3:
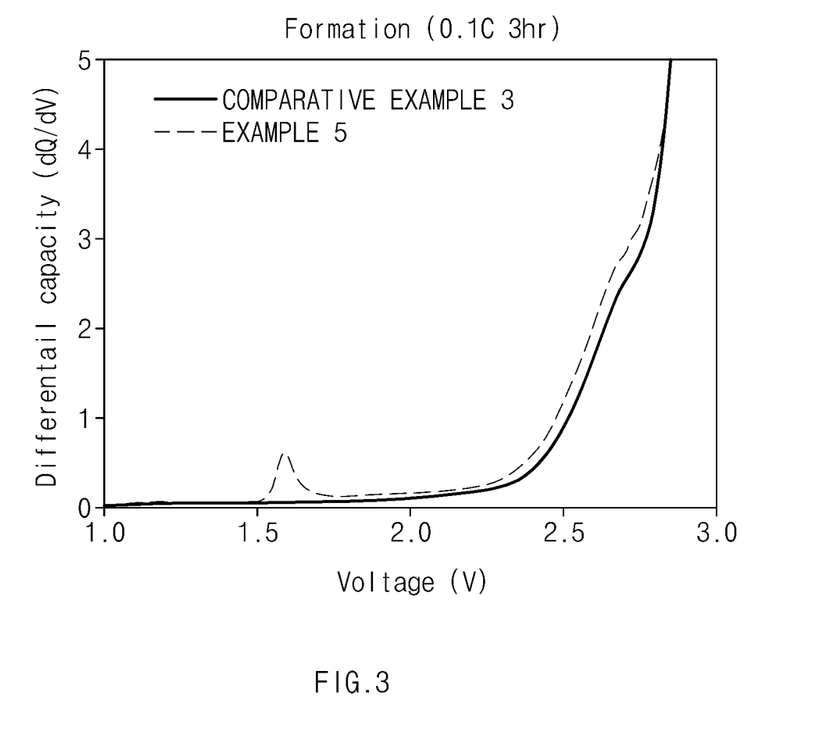
FIG. 3 is a graph illustrating differential capacity curves of lithium secondary batteries of Example 5 and Comparative Example 3 according to Experimental Example 3.

Referring to FIG. 3, with respect to the lithium secondary battery of Example 5 which included the non-aqueous electrolyte solution of the present invention including the additive, a decomposition peak, in which electrolyte solution decomposition occurred at about 1.6 V, was confirmed in comparison to the secondary battery of Comparative Example 3 including the non-aqueous electrolyte solution without the additive. According to this behavior, it may be indirectly confirmed that the additive included in the non-aqueous electrolyte solution of the present invention additionally formed another type of SEI on the surface of the negative electrode while being decomposed earlier than other components.

Experimental Example 4. Initial Capacity Evaluation Test

Each of the secondary batteries prepared in Examples 5 and 6 and Comparative Example 3 was charged at 0.3 C rate to 4.2 V under a constant current-constant voltage (CC-CV) condition at room temperature (23° C.) and discharged at 0.3 C rate under a CC condition to 2.5 V, and each secondary battery was charged at 1 C/4.2 V under a constant current/constant voltage (CC/CV) condition at room temperature (23° C.) until the current reached 1/20 (mA) of 1 C, and then again discharged at a current of 1 C to 2.5 V to measure initial capacity. The results thereof are presented in Table 2 below.

TABLE 2

|  | 0.33 C capacity (mAh) |
| --- | --- |
| Example 5 | 102.5 |
| Example 6 | 98.2 |
| Comparative Example 3 | 93.0 |

As illustrated in Table 2, it may be understood that initial capacity of the secondary battery of Comparative Example 3 was reduced in comparison to initial capacities of the secondary batteries of Examples 5 and 6.

Experimental Example 5. Evaluation of Film Formation (2)

Electrochemical impedance spectroscopy (EIS) was measured for each of the secondary batteries of Example 5 and Comparative Example 3, after the completion of the initial capacity evaluation in Experimental Example 4, using a potentiostat.

Figure 4:
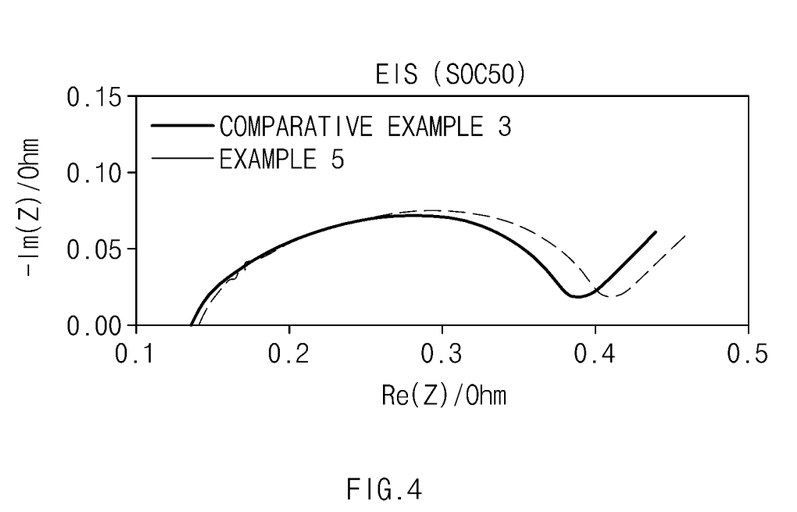
FIG. 4 is a graph illustrating the results of impedance evaluation of the lithium secondary batteries of Example 5 and Comparative Example 3 according to Experimental Example 5.

Specifically, after each of the secondary battery of Example 5 and the secondary battery of Comparative Example 3 was charged at a current of 54 mA to a state of charge (SOC) of 50%, a small voltage (14 mv) was applied over a frequency range of 50 mHz to 200 kHz to measure the resulting current response, and the results thereof are then presented in FIG. 4.

Referring to FIG. 4, with respect to the secondary battery of Example 5, since a film is formed, it may be confirmed that impedance was increased in comparison to that of the secondary battery of Comparative Example 3. That is, according to these results, it may be confirmed that the robust film was formed by the additive included in the non-aqueous electrolyte solution of the present invention.

Experimental Example 6. High-Temperature (45° C.) Cycle Characteristics Evaluation

Each of the secondary battery prepared in Example 5 and the secondary battery prepared in Comparative Example 3 was charged at 1 C rate to 4.2 V under a constant current/constant voltage (CC/CV) condition at 45° C. until the current reached 1/20 (mA) of 1 C and then discharged at a current of 1 C to 2.5 V. The above charging and discharging were set as one cycle, and 200 cycles were repeated. Next, a discharge capacity retention was calculated using the following Equation 1, and the results thereof are presented in FIG. 5.

Figure 5:
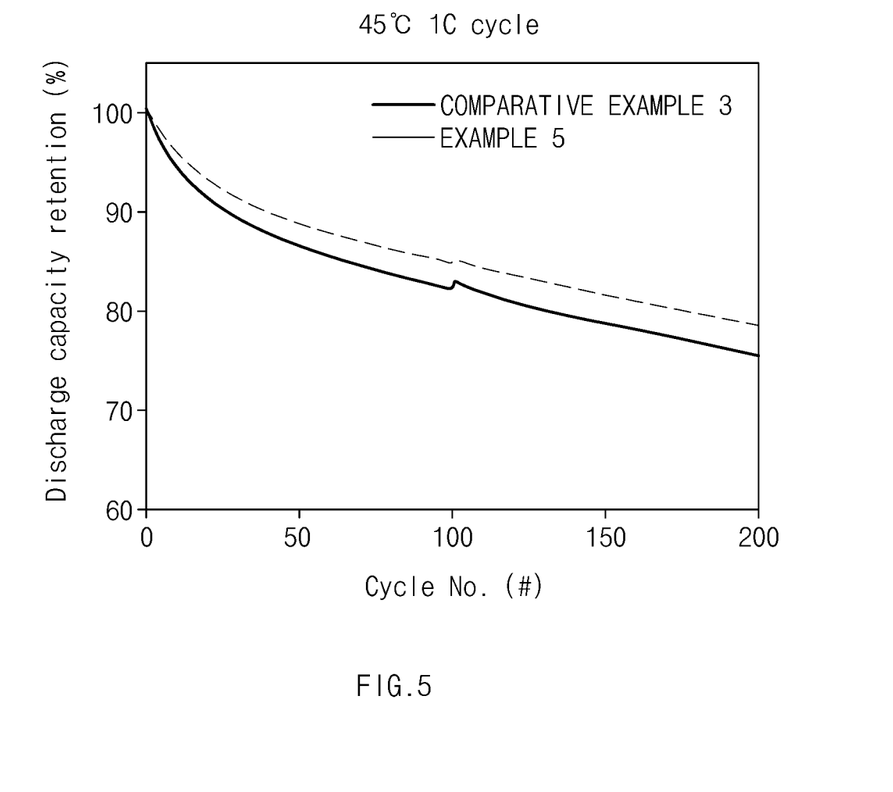
FIG. 5 is a graph illustrating the results of high-temperature cycle characteristics evaluation of the secondary batteries of Example 5 and Comparative Example 3 according to Experimental Example 6.

Discharge capacity retention (%)=(discharge capacity after $N^{th}$ charge and discharge/discharge capacity after $1^{st}$ charge and discharge)×100 [Equation 1]

Referring to FIG. 5, with respect to the secondary battery of Example 5 including the additive of the present invention, it may be understood that 1 C discharge capacity retention after a $200^{th}$ charge/discharge cycle was greater than that of the secondary battery of Comparative Example 3. Thus, it may be confirmed that the high-rate discharge capacity retention at high temperature was improved when the coumarin-3-carbonitrile compound was used as the additive in the non-aqueous electrolyte solution.

The invention claimed is:

1. A non-aqueous electrolyte solution for a lithium secondary battery, the non-aqueous electrolyte solution comprising:
   a lithium salt;
   an organic solvent; and
   a compound represented by Formula 1 as an additive,

[Formula 1]

wherein, in Formula 1,
$R_1$ is a —CN group, $R_2$ is hydrogen or an alkyl group having 1 to 3 carbon atoms, and $R_3$ to $R_6$ are each independently hydrogen, an alkyl group having 1 to 3 carbon atoms, or a —CN group.

2. The non-aqueous electrolyte solution for a lithium secondary battery of claim 1, wherein, in Formula 1, $R_1$ is a —CN group, $R_2$ is hydrogen, $R_3$ and $R_6$ are each independently hydrogen or a —CN group, and $R_4$ and $R_5$ are each independently hydrogen, an alkyl group having 1 to 3 carbon atoms, or a —CN group.

3. The non-aqueous electrolyte solution for a lithium secondary battery of claim 1, wherein the compound represented by Formula 1 comprises a compound represented by Formula 1a:

[Formula 1a]

4. The non-aqueous electrolyte solution for a lithium secondary battery of claim 1, wherein the compound represented by Formula 1 is present in an amount of 0.05 wt % or more to less than 1.2 wt % based on a total weight of the non-aqueous electrolyte solution.

5. The non-aqueous electrolyte solution for a lithium secondary battery of claim 4, wherein the compound represented by Formula 1 is present in an amount of 0.1 wt % to 1 wt % based on the total weight of the non-aqueous electrolyte solution.

6. A lithium secondary battery, comprising:
   a negative electrode;
   a positive electrode;
   a separator disposed between the negative electrode and the positive electrode; and
   a non-aqueous electrolyte solution,
   wherein the non-aqueous electrolyte solution comprises the non-aqueous electrolyte solution of claim 1.

7. The lithium secondary battery of claim 6, wherein the positive electrode comprises a positive electrode active material which includes lithium and at least one of nickel (Ni), cobalt (Co), manganese (Mn), iron (Fe), or aluminum (Al).

* * * * *